United States Patent
Lee et al.

(10) Patent No.: US 12,399,822 B2
(45) Date of Patent: Aug. 26, 2025

(54) METHOD AND APPARATUS FOR PERFORMING DATA ACCESS MANAGEMENT OF MEMORY DEVICE IN PREDETERMINED COMMUNICATIONS ARCHITECTURE WITH AID OF MULTI-TABLE CHECKING

(71) Applicant: Silicon Motion, Inc., Hsinchu County (TW)

(72) Inventors: Jie-Hao Lee, Hsinchu County (TW); Ting-Fong Hsu, Taoyuan (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/236,939

(22) Filed: Aug. 22, 2023

(65) Prior Publication Data
US 2025/0068561 A1    Feb. 27, 2025

(51) Int. Cl.
*G06F 12/02* (2006.01)

(52) U.S. Cl.
CPC .. *G06F 12/0292* (2013.01); *G06F 2212/1024* (2013.01); *G06F 2212/2022* (2013.01)

(58) Field of Classification Search
CPC ................. G06F 2212/1024; G06F 2212/2022
See application file for complete search history.

(56) References Cited

U.S. PATENT DOCUMENTS

| | | | |
|---|---|---|---|
| 2019/0146909 A1 | 5/2019 | Chu et al. | |
| 2019/0188130 A1 | 6/2019 | Chien | |
| 2021/0397370 A1 | 12/2021 | Chen | |
| 2022/0138096 A1* | 5/2022 | Kang | .................. G06F 12/0884 711/154 |

FOREIGN PATENT DOCUMENTS

| | | |
|---|---|---|
| CN | 108664418 A | 10/2018 |
| TW | 201931363 A | 8/2019 |
| TW | 202101226 A | 1/2021 |
| TW | 202125263 A | 7/2021 |

* cited by examiner

*Primary Examiner* — Edward J Dudek, Jr.
(74) *Attorney, Agent, or Firm* — Winston Hsu

(57) ABSTRACT

A method for performing data access management of a memory device in predetermined communications architecture with aid of multi-table checking and associated apparatus are provided. The method may include: utilizing the memory controller to receive a first command from a host device, wherein the first command indicates that reading first data at a first logical address is requested; checking at least one logical-to-physical (L2P) address mapping table to generate a first checking result and starting performing a first read operation according to the first checking result, and checking a temporary physical-to-logical (P2L) address mapping table corresponding to a first active block to generate a second checking result for selectively performing a second read operation according to the second checking result; and returning the first data to the host device, wherein the first data is read according to one of the first checking result and the second checking result.

12 Claims, 5 Drawing Sheets

METHOD AND APPARATUS FOR PERFORMING DATA ACCESS MANAGEMENT OF MEMORY DEVICE IN PREDETERMINED COMMUNICATIONS ARCHITECTURE WITH AID OF MULTI-TABLE CHECKING

BACKGROUND OF THE INVENTION

1. Field of the Invention

The present invention is related to memory control, and more particularly, to a method and apparatus for performing data access management of a memory device in a predetermined communications architecture with aid of multi-table checking.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. The memory device may be arranged to store various files such as system files, user files, etc. in a file system of a host. As some files may be frequently accessed, some data may become invalid data. When the invalid data and some valid data are mixed together at the same storage block within the memory device, it is typically needed to perform garbage collection (GC) to release more storage space for further use. In addition, during accessing of the files, internal management information may change correspondingly. As associated processing of a portion of the internal management information may have not been completed, before reading any data from the Flash memory, the memory device may need to perform a searching operation first, causing the total processing time of the reading operation to be increased. It seems that there is no proper suggestion in the related art. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing data access management of a memory device in a predetermined communications architecture (e.g., a UFS communications architecture) with aid of multi-table checking, in order to solve the above-mentioned problems.

At least one embodiment of the present invention provides a method for performing data access management of a memory device in a predetermined communications architecture with aid of multi-table checking, where the method can be applied to a memory controller of the memory device. The memory device may comprise the memory controller and a non-volatile (NV) memory, the NV memory may comprise at least one NV memory element (e.g., one or more NV memory elements), and the at least one NV memory element may comprise a plurality of blocks. The method may comprise: utilizing the memory controller to receive a first command from a host device through a transmission interface circuit of the memory controller, wherein the first command indicates that reading first data at a first logical address is requested; checking at least one logical-to-physical (L2P) address mapping table to generate a first checking result and starting performing a first read operation according to the first checking result, and checking a temporary physical-to-logical (P2L) address mapping table corresponding to a first active block to generate a second checking result for selectively performing a second read operation according to the second checking result; and returning the first data to the host device, wherein the first data is read according to one of the first checking result and the second checking result.

In addition to the above method, the present invention also provides a memory controller of a memory device, where the memory device comprises the memory controller and an NV memory. The NV memory may comprise at least one NV memory element (e.g., one or more NV memory elements), and the at least one NV memory element may comprise a plurality of blocks. In addition, the memory controller comprises a processing circuit that is arranged to control the memory controller according to a plurality of host commands from a host device, to allow the host device to access the NV memory through the memory controller, wherein the processing circuit is arranged to perform data access management of the memory device in a predetermined communications architecture with aid of multi-table checking. The memory controller further comprises a transmission interface circuit, and the transmission interface circuit is arranged to perform communications with the host device. For example, the memory controller receives a first command from the host device through the transmission interface circuit of the memory controller, wherein the first command indicates that reading first data at a first logical address is requested; the memory controller checks at least one logical-to-physical (L2P) address mapping table to generate a first checking result and starts performing a first read operation according to the first checking result, and checks a temporary physical-to-logical (P2L) address mapping table corresponding to a first active block to generate a second checking result for selectively performing a second read operation according to the second checking result; and the memory controller returns the first data to the host device, wherein the first data is read according to one of the first checking result and the second checking result.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the electronic device.

According to some embodiments, the memory device may store data for the host device, where updating some data among the stored data may be needed. In order to correct the related art problems, it is suggested that the memory device may operate according to at least one control scheme (e.g., one or more control schemes) of the method to perform associated operations, and more particularly, try accessing the stored data according to a first address mapping table belonging to a first type among two different address mapping tables belonging to different types and try accessing the stored data according to a second address mapping table belonging to a second type among the two different address mapping tables at the same time, and continue only one operation among a first operation of trying accessing the stored data according to the first address mapping table and a second operation of trying accessing the stored data according to the second address mapping table, depending on which of the first operation and the second operation is proper, in order to obtain the stored data from a correct location within the NV memory as soon as possible.

The present invention method and apparatus can guarantee that the memory device can operate properly in various situations. For example, when receiving a host command indicating a read request from the host device, the memory device may start referring to two different address mapping tables belonging to different types to perform subsequent processing, respectively, in order to decrease an expected value of the total processing time of reading data from the NV memory since the receiving time of the host command (e.g., the time point at which the host command is received), and therefore enhance overall performance. For example, as time goes by, the memory device may perform multiple reading operations for the host device, respectively, and complete most reading operations among the multiple reading operations efficiently, where the average processing time of the multiple reading operations may be decreased. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
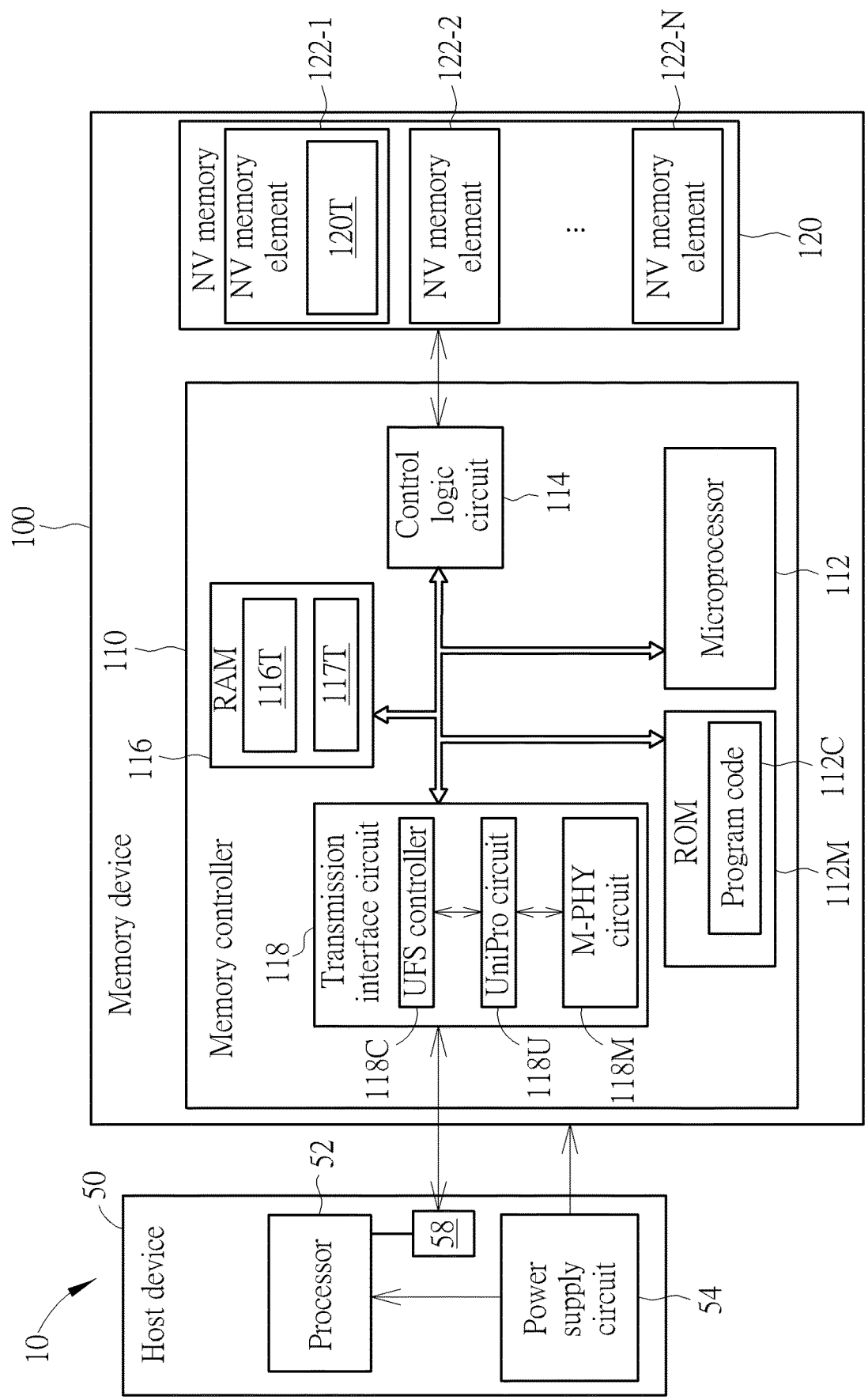
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a Random Access Memory (RAM) 116, and a transmission interface circuit 118, where at least one portion (e.g., a portion or all) of the above components may be coupled to one another via a bus. The RAM 116 may be arranged to provide the memory controller 110 with internal storage space (for example, may temporarily store information), where the RAM 116 may be implemented by way of Static Random Access Memory (SRAM), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction, and the transmission interface circuit 118 may comprise multiple sub-circuits, which may interact with each other to perform communications. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (or the transmission interface circuit 58 therein) according to the one or more communications specifications for the memory device 100. Similarly, the transmission interface circuit 58 may conform to the one or more communications specifications, and may perform communications with the memory device 100 (or the transmission interface circuit 118 therein) according to the one or more communications specification for the host device 50. For example, the multiple sub-circuits of the transmission interface circuit 118 may comprise a UFS controller 118C, a UniPro circuit 118U and a physical layer (PHY) circuit such as a MIPI M-PHY circuit 118M (labeled "M-PHY circuit" for brevity), and the transmission interface circuit 58 may be implemented to have a circuitry architecture (e.g., multiple corresponding sub-circuits) similar to or the same as that of the transmission interface circuit 118, but the present invention is not limited thereto.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationships between the physical addresses and the logical addresses. The NV memory 120 may store a global L2P address mapping table 120T, for the memory controller 110 to control the memory device 100 to access data in the NV memory 120, but the present invention is not limited thereto. In addition, the memory controller 110 may generate or update at least one physical-to-logical (P2L) address mapping table such as a temporary P2L address mapping table 117T. For example, when there is a need, the memory controller 110 may refer to the temporary P2L address mapping table 117T to perform some internal management operations such as garbage collection (GC) operations, etc.

For better comprehension, the global L2P address mapping table 120T may be located in a predetermined region within the NV memory element 122-1, such as a system region, but the present invention is not limited thereto. For example, the global L2P address mapping table 120T may be divided into a plurality of local L2P address mapping tables, and the plurality of local L2P address mapping tables may be stored in one or more of the NV memory elements 122-1, 122-2, . . . , and 122-N, and more particularly, may be stored in the NV memory elements 122-1, 122-2, . . . , and 122-N, respectively. When there is a needed, the memory controller 110 may load at least one portion (e.g., a portion or all) of the global L2P address mapping table 120T into the RAM 116 or other memories. For example, the memory controller 110 may load a local L2P address mapping table (e.g., a first local L2P address mapping table) among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto.

The memory region of the RAM 116 may comprise multiple sub-regions for temporarily storing various information such as buffered data, the temporary L2P address mapping table 116T, the temporary P2L address mapping table 117T, etc., and at least one portion of sub-regions (e.g., a portion of sub-regions or all sub-regions) among the multiple sub-regions of the memory region may be regarded as a data buffer. For example, the sub-region for temporarily storing the buffered data may be regarded as the data buffer, but the present invention is not limited thereto. According to some embodiments, the whole of the memory region, such as the multiple sub-regions for temporarily storing the buffered data, the temporary L2P address mapping table 116T, the temporary P2L address mapping table 117T, etc., may be regarded as the data buffer.

In addition, the aforementioned at least one NV memory element (e.g., the one or more NV memory elements such as {122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-$n$ (where "n" may represent any integer in the interval [1, N]) within the NV memory elements 122-1, 122-2, . . . , and 122-N may comprise multiple blocks, and a block among the multiple blocks may comprise and record a specific number of pages, where the memory controller 110 may access a certain page of a certain block among the multiple blocks according to a block address and a page address.

According to some embodiments, the memory controller 110 may monitor valid page counts of the plurality of blocks, respectively, for subsequent processing such as the GC operations. Regarding data reception, the memory controller 110 may configure at least one block (e.g., one or more blocks) among the plurality of blocks of the aforementioned at least one NV memory element (e.g., the one or more NV memory elements such as {122-1, 122-2, . . . , 122-N}) in the NV memory 120 to be at least one active block (e.g., one or more active blocks), and utilize the aforementioned at least one active block to receive and store data from the host device 50, such as host-write data. For example, the data such as the host-write data (e.g., the data to be written into the NV memory 120) may comprise a plurality of sets of partial data, and the aforementioned at least one active block may comprise a first active block, where the temporary P2L address mapping table 117T may correspond to the first active block, and more particularly, store the associated mapping information for indicating P2L address mapping relationships regarding the first active block. In addition, the memory controller 110 may maintain (e.g., generate or update) the temporary P2L address mapping table 117T, in order to perform the associated internal management.

Figure 2:
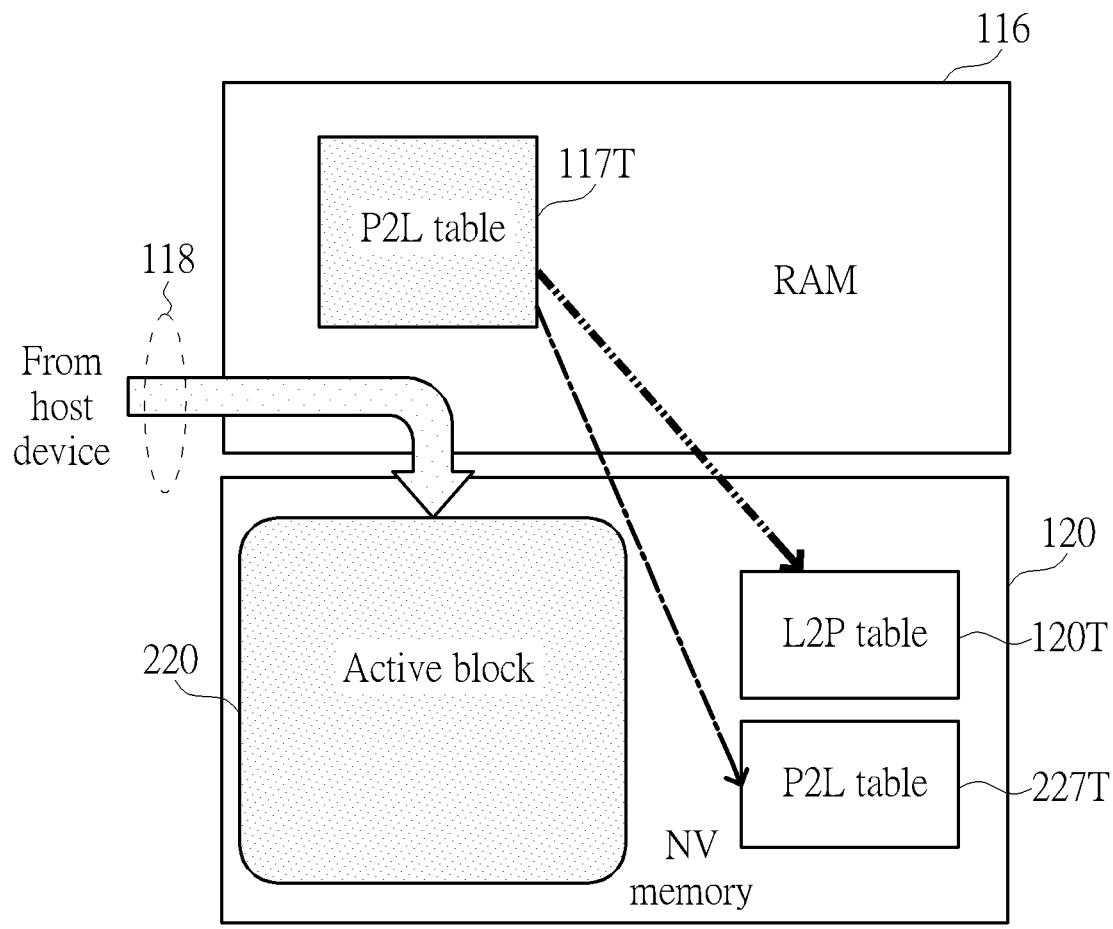
FIG. 2 illustrates a first table processing control scheme according to an embodiment of the present invention.

FIG. 2 illustrates a first table processing control scheme according to an embodiment of the present invention. During receiving and storing the data such as the host-write data (e.g., the data to be written into the NV memory 120) from the host device 50, the memory controller 110 may utilize the first active block such as an active block 220 to receive and store one or more sets of partial data among the plurality of sets of partial data, and record the associated mapping information such as P2L table entries into the temporary P2L address mapping table 117T (labeled "P2L table" for brevity) corresponding to the active block 220, for indicating the P2L address mapping relationships regarding the active block 220. The P2L address mapping relationships indicated by the P2L table entries may comprise the P2L address mapping relationships between the logical addresses at which the one or more sets of partial data are written by the host device 50 and the physical addresses indicating the locations where the one or more sets of partial data are stored in the active block 220. When a first predetermined criterion (e.g., the active block 220 is fully programmed) is met, the memory controller 110 may perform a set of table processing operations, and the set of table processing operations may comprise:

(1) a first table processing operation: updating the global L2P address mapping table 120T (labeled "L2P table" for brevity) according to the temporary P2L address mapping table 117T (labeled "P2L table" for brevity) corresponding to the active block 220, and more particularly, updating some L2P table entries (labeled "L2P entries" for brevity) in the global L2P address mapping table 120T according to the P2L table entries (labeled "P2L entries" for brevity) in the temporary P2L address mapping table 117T, for indicating L2P address mapping relationships regarding the active block 220;

(2) a second table processing operation: storing the temporary P2L address mapping table 117T (e.g., the P2L table entries therein) into the NV memory 120 to generate or update a first P2L address mapping table such as a P2L address mapping table 227T (labeled "P2L table" for brevity), for example, by writing all P2L table entries recorded in the temporary P2L address mapping table 117T into the P2L address mapping table 227T, for performing the subsequent processing mentioned above, where the P2L address mapping table 227T may be regarded as a backup version of the temporary P2L address mapping table 117T; and (3) a third table processing operation: after performing the first table processing operation (e.g., updating the global L2P address mapping table 120T according to the temporary P2L address mapping table 117T) and the second table processing operation (e.g., storing the temporary P2L address mapping table 117T into the NV memory 120), clearing the temporary P2L address mapping table 117T (e.g., the P2L table entries therein), for reusing the temporary P2L address mapping table 117T and/or the corresponding storage space in the RAM 116;

but the present invention is not limited thereto. According to some embodiments, the first table processing operation may comprise loading a certain local L2P address mapping table (e.g., the first local L2P address mapping table) within the global L2P address mapping table 120T into the RAM 116 to be the temporary L2P address mapping table 116T, updating one or more L2P table entries in the temporary L2P address mapping table 116T to indicate one or more L2P address mapping relationships regarding the active block 220, and updating the global L2P address mapping table 120T (e.g., this local L2P address mapping table therein) according to the temporary L2P address mapping table 116T.

According to some embodiments, the first predetermined criterion may be replaced with any criterion among multiple predetermined criteria, to allow the memory controller 110 to perform the set of table processing operations when the aforementioned any criterion is met. For example, the multiple predetermined criteria may comprise:

(1) the first predetermined criterion: the active block 220 is fully programmed; and (2) a second predetermined criterion: the number of P2L table entries recorded in the temporary P2L address mapping table 117T reaches a predetermined entry count;

where the predetermined entry count may represent a predetermined table size of the temporary P2L address mapping table 117T. For example, when the active block 220 is fully programmed or the number of P2L table entries recorded in the temporary P2L address mapping table 117T reaches the predetermined entry count, the memory controller 110 may perform the set of table processing operations.

After any active block (e.g., the active block 220) among the aforementioned at least one active block is fully programmed, the memory device 100 (or the memory controller 110 therein) may close the aforementioned any active block to make the aforementioned any active block become an inactive block, and select a blank block (e.g., an erased block) to be a replacement of the aforementioned any active block, for performing subsequent data reception corresponding to the aforementioned any active block. In addition, the subsequent processing mentioned above may comprise performing a GC procedure to write valid data among all data in the inactive block into another blank block (e.g., another erased block), but the present invention is not limited thereto.

According to some embodiments, as the P2L address mapping relationships indicated by the P2L table entries in the aforementioned at least one P2L address mapping table (e.g., the temporary P2L address mapping table 117T or the P2L address mapping table 227T) and the L2P address mapping relationships indicated by the associated L2P table entries in the L2P address mapping table 120T are supposed to be inverse address mapping relationships of each other, the memory controller 110 may determine the latest mapping information (e.g., physical addresses) carried by the associated L2P table entries in the L2P address mapping table 120T according to the latest mapping information (e.g., logical addresses) carried by the P2L table entries in the aforementioned at least one P2L address mapping table. In addition, the memory controller 110 may use the plurality of local L2P address mapping tables to manage the relationships between the physical addresses and the logical addresses, such as the physical addresses indicating the locations where the host-write data are stored in the NV memory 120 and the logical addresses at which the host-write data are written by the host device 50. For example, the plurality of local L2P address mapping tables may be implemented as a series of local L2P address mapping tables {L2PT(1), L2PT(2), . . . , L2PT(X)} respectively corresponding to a series of logical address ranges {L_Addr_R(1), L_Addr_R(2), . . . , L_Addr_R(R_CNT)}, and the series of logical address ranges {L_Addr_R(1), L_Addr_R(2), . . . , L_Addr_R(R_CNT)} may be implemented as a series of consecutive ranges of a series of consecutive logical addresses {L_Addr(0), L_Addr(1), . . . , L_Addr((R_CNT*R_Size)−1)}, such as the ranges of the R_CNT intervals [L_Addr(0), L_Addr(R_Size−1)], [L_Addr (R_Size), L_Addr((2*R_Size)−1)], . . . and [L_Addr((R_CNT−1)*R_Size), L_Addr((R_CNT*R_Size)−1)].

According to some embodiments, the memory device 100 (or the memory controller 110 therein) may update the global L2P address mapping table 120T according to the aforementioned at least one P2L address mapping table (e.g., the temporary P2L address mapping table 117T or the P2L address mapping table 227T), where the address mapping relationships indicated by the aforementioned at least one P2L address mapping table (e.g., the temporary P2L address mapping table 117T or the P2L address mapping table 227T) is typically newer than the address mapping relationships indicated by the global L2P address mapping table 120T. For example, in an embodiment, the memory device 100 (or the memory controller 110 therein) may operate according to a search and read control scheme, and more particularly, perform a search operation on the aforementioned at least one P2L address mapping table (e.g., the temporary P2L address mapping table 117T or the P2L address mapping table 227T) before reading any data from the NV memory 120, but the present invention is not limited thereto. For better comprehension, assume that the expected value of the time for searching for a target logical address such as a logical address L_Addr in the temporary P2L address mapping table 117T may be equal to a search time T_search (e.g., 15 microseconds (μs)), no matter whether the logical address L_Addr is found in the temporary P2L address mapping table 117T, and the expected value of the time for reading the aforementioned any data from the NV memory 120 may be equal to a read time T_read such as a busy time tR (e.g., 68 μs). Thus, the memory device 100 (or the memory controller 110 therein) operating according to the search and read control scheme may need at least the search and read time (T_search+T_read) to make the aforementioned any data be ready in the memory controller 110, for being returned to the host device 50. In some other embodiments, the memory device 100 (or the memory controller 110 therein) may operate according to at least one other control scheme (e.g., one or more other control schemes) to hide the search time T_search in the read time T_read, in order to enhance the overall performance.

Figure 3:
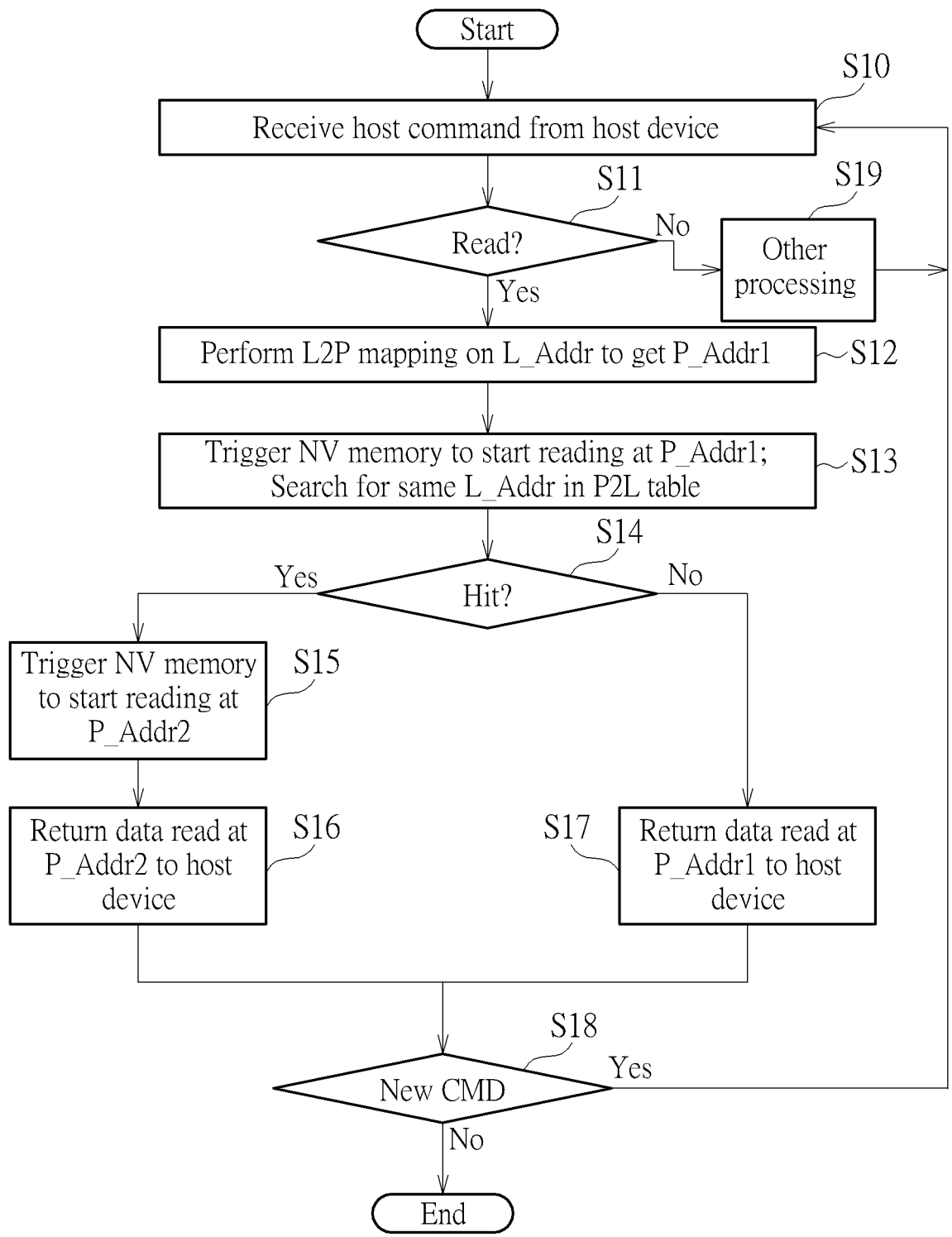
FIG. 3 illustrates a search-time-hidden table processing control scheme of a method for performing data access management of a memory device in a predetermined communications architecture with aid of multi-table checking according to an embodiment of the present invention.

FIG. 3 illustrates a search-time-hidden table processing control scheme of a method for performing data access management of a memory device in a predetermined communications architecture with aid of multi-table checking according to an embodiment of the present invention. The memory device 100 (or the memory controller 110 therein) may operate according to the search-time-hidden table processing control scheme shown in FIG. 3.

In Step S10, the memory device 100 (or the memory controller 110) may receive a host command among the plurality of host commands from the host device 50.

In Step S11, the memory device 100 (or the memory controller 110) may check whether the host command (e.g., the host command that has just been received from the host device 50 as mentioned in Step S10) is a first command such as a read command (labeled "Read" for brevity). If Yes, Step S12 is entered; if No, Step S19 is entered. For example, the first command may carry first information related to first data to be read, and the first information may comprise a first logical address such as the logical address L_Addr, where the first command may indicate that reading the first data from the logical address L_Addr is requested, but the present invention is not limited thereto. In addition to the first logical address (e.g., the logical address L_Addr), the first information may further comprise a first data length (e.g., a length LENGTH) of the first data, for indicating a first logical address region starting from the first logical address, such as a logical address region L_Addr_Region starting from the logical address L_Addr and having the length LENGTH, where the first command may indicate that reading the first data from the first logical address region such as the logical address region L_Addr_Region is requested.

In Step S12, the memory device 100 (or the memory controller 110) may perform a first L2P address mapping operation (labeled "L2P mapping" for brevity) on the logical address L_Addr according to the L2P address mapping table 120T to get a first physical address P_Addr1 associated with the logical address L_Addr.

In Step S13, the memory device 100 (or the memory controller 110) may trigger the NV memory 120 with a first NV read command (e.g., a flash read command) among the operating commands to start reading at the first physical address P_Addr1 associated with the logical address L_Addr (e.g., reading the data stored at the first physical address P_Addr1 from the NV memory 120), and search for the same logical address L_Addr in the temporary P2L address mapping table 117T (labeled "P2L table" for brevity) corresponding to the active block 220, in order to try obtaining any physical address (e.g., a second physical address P_Addr2) associated with the logical address L_Addr according to the temporary P2L address mapping table 117T.

In Step S14, the memory device 100 (or the memory controller 110) may check whether the logical address L_Addr is found in the temporary P2L address mapping table 117T (labeled "Hit" for better comprehension). If Yes (e.g., the first logical address is found in the temporary P2L address mapping table 117T), Step S15 is entered; if No (e.g., the first logical address is not found in the temporary P2L address mapping table 117T), Step S17 is entered.

In Step S15, the memory device 100 (or the memory controller 110) may trigger the NV memory 120 with a second NV read command (e.g., another flash read command) among the operating commands to start reading at the second physical address P_Addr2 associated with the logical address L_Addr (e.g., reading the data stored at the second physical address P_Addr2 from the NV memory 120).

In Step S16, the memory device 100 (or the memory controller 110) may return the data read at the second physical address P_Addr2 to the host device 50 to be the first data.

In Step S17, the memory device 100 (or the memory controller 110) may return the data read at the first physical address P_Addr1 to the host device 50 to be the first data.

In Step S18, the memory device 100 (or the memory controller 110) may check whether there is any new host-side event such as any new command (CMD) from the host device 50 (labeled "New CMD" for brevity), and more particularly, wait for the aforementioned any new host-side event until a predetermined waiting time period expires. If Yes (e.g., the aforementioned any new host-side event is detected by the memory controller 110 before the predetermined waiting time period expires), Step S10 is entered; if No (e.g., no host-side event is detected by the memory controller 110 before the predetermined waiting time period expires), the working flow shown in FIG. 3 comes to the end.

In Step S19, the memory device 100 (or the memory controller 110) may perform other processing according to the host command (e.g., the host command that has just been received from the host device 50 as mentioned in Step S10).

The memory device 100 (or the memory controller 110 therein) may perform the operation of Step S12 vary fast, and then trigger the NV memory 120 with the first NV read command and start searching for the logical address L_Addr in the temporary P2L address mapping table 117T at the same time (or almost at the same time) in Step S13, in order to hide the search time T_search (e.g., 15 μs) in the read time T_read (e.g., 68 μs), and therefore enhance the overall performance. Assume that the hit rate of the searching operation in Step S13 is equal to P %, where "P" may represent a positive value in the interval [0, 100]. The expected value of the time for the memory device 100 (or the memory controller 110 therein) to make the first data be ready in the memory controller 110 for being returned to the host device 50 in response to the first command such as the read command may be equal to the total processing time T_total as follows:

$$T\_total = ((100 - P) \% * T\_read) + (P \% * (2 * T\_read));$$

where the hit rate P % may be very low. For example, P=1, and the total processing time T_total may be rewritten as follows:

$$T\_total = (99\% * T\_read) + (1\% * (2 * T\_read)) = 1.01 * T\_read;$$

where the total processing time T_total (e.g., 68.68 μs) may be approximately equal to the read time T_read (e.g., 68 μs).

For better comprehension, the method may be illustrated with the working flow shown in FIG. 3, but the present invention is not limited thereto. According to some embodiments, one or more steps may be added, deleted, or changed in the working flow shown in FIG. 3.

Figure 4:
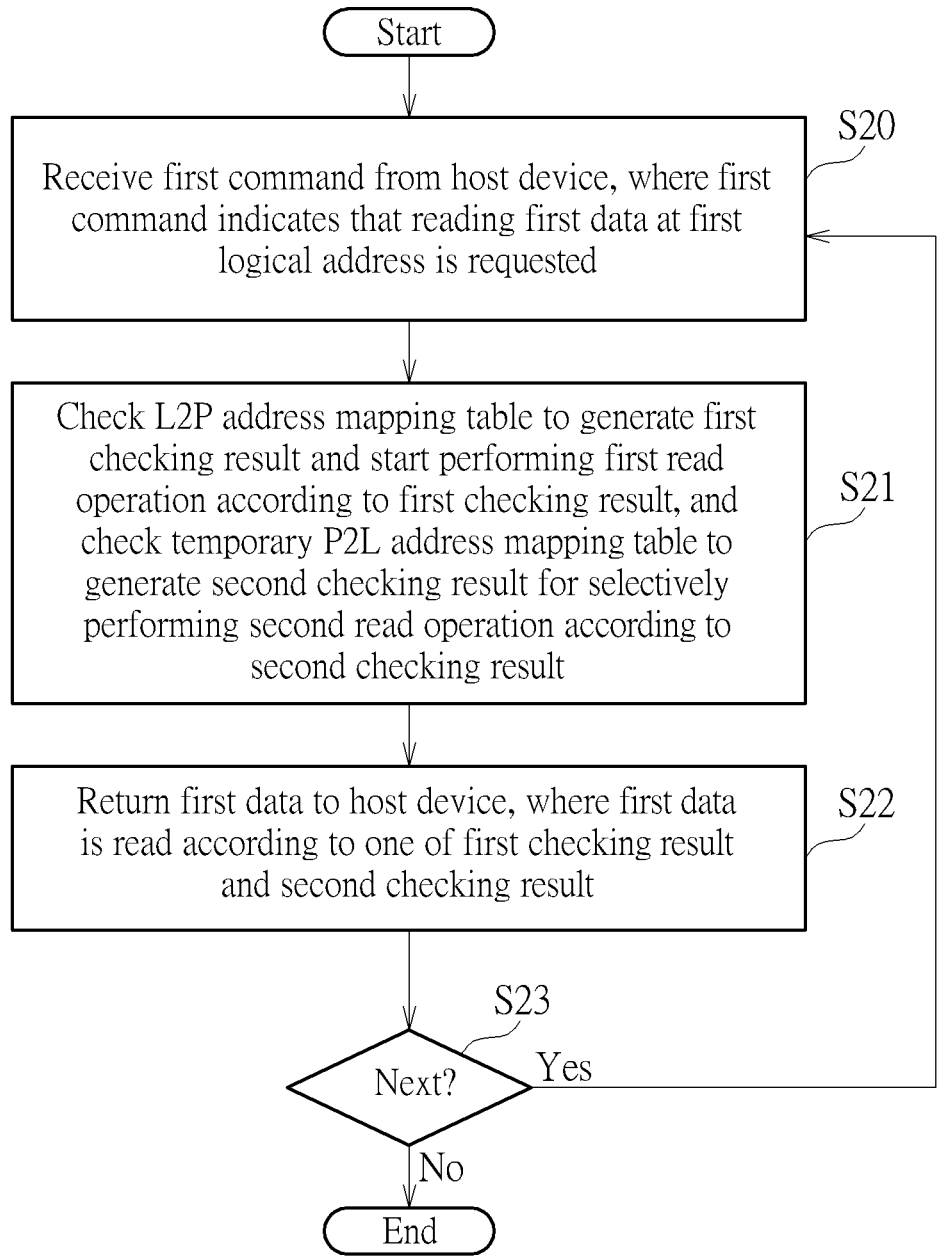
FIG. 4 illustrates a working flow of the method according to an embodiment of the present invention.

FIG. 4 illustrates a working flow of the method according to an embodiment of the present invention. The memory device 100 (or the memory controller 110 therein) may operate according to the working flow shown in FIG. 4.

In Step S20, the memory device 100 (or the memory controller 110) may receive a first command such as the first command mentioned above from the host device 50 through the transmission interface circuit 118 of the memory controller 110, where the first command may indicate that reading the first data at the first logical address such as the logical address L_Addr is requested.

In Step S21, the memory device 100 (or the memory controller 110) may check the aforementioned at least one L2P address mapping table such as the L2P address mapping table 120T to generate a first checking result and start performing a first read operation according to the first checking result, and check the temporary P2L address mapping table 117T corresponding to the active block 220 to generate a second checking result for selectively performing a second read operation according to the second checking result. For example, the operation of Step S21 may comprise:

(1) the memory device 100 (or the memory controller 110) may check the aforementioned at least one L2P address mapping table such as the L2P address mapping table 120T to obtain the first physical address P_Addr1 associated with the logical address L_Addr from the L2P address mapping table 120T to be the first checking result, for example, by performing the operation of Step S12, where the aforementioned at least one L2P address mapping table such as the L2P address mapping table 120T may be arranged to map from the logical address L_Addr to the first physical address P_Addr1, to allow the memory controller 110 to perform the first read operation according to the first physical address P_Addr1, and more particularly, trigger the NV memory 120 with the first NV read command (e.g., the flash read command) to start reading at the first physical address P_Addr1 associated with the logical address L_Addr as mentioned in Step S13; and (2) the memory device 100 (or the memory controller 110) may check the temporary P2L address mapping table 117T corresponding to the active block 220 by searching for the logical address L_Addr in the temporary P2L address mapping table 117T as mentioned in Step S13, in order to try obtaining the aforementioned any physical address (e.g., the second physical address P_Addr2) associated with the logical address L_Addr according to the temporary P2L address mapping table 117T to be the second checking result;

wherein, whether the second read operation is performed may depend on whether the logical address L_Addr is found in the temporary P2L address mapping table 117T.

For example, if the logical address L_Addr is found in the temporary P2L address mapping table 117T (e.g., the determination result "Yes" of Step S14), the memory controller 110 may be arranged to perform the second read operation according to the aforementioned any physical address (e.g., the second physical address P_Addr2) associated with the logical address L_Addr, and more particularly, trigger the NV memory 120 with the second NV read command (e.g., the other flash read command) to start reading at the second physical address P_Addr2 associated with the logical address L_Addr as mentioned in Step S15; otherwise (e.g., the determination result "No" of Step S14), the memory controller 110 may be arranged to prevent performing the second read operation. In addition, the second checking result may indicate whether the logical address L_Addr is found in the temporary P2L address mapping table 117T, for determining whether to perform the second read operation, but the present invention is not limited thereto. According to some embodiments, if the logical address L_Addr is found in the temporary P2L address mapping table 117T (e.g., the determination result "Yes" of Step S14), the memory controller 110 may be arranged to determine the aforementioned any physical address (e.g., the second physical address P_Addr2) associated with the logical address L_Addr to be the second checking result; otherwise (e.g., the determination result "No" of Step S14), the memory controller 110 may be arranged to determine a null physical address P_Addr_Null associated with no logical address to be the second checking result, where the null physical address P_Addr_Null may represent an invalid physical address such as a null value, and cannot be associated with any logical address. For example, the memory controller 110 may call a search function among multiple functions of the memory controller 110 to search for the logical address L_Addr in the temporary P2L address mapping table 117T as mentioned in Step S13, and the search function may return the second checking result (e.g., the second physical address P_Addr2 or the null physical address P_Addr_Null.

In Step S22, the memory device 100 (or the memory controller 110) may return the first data to the host device 50, where the first data may be read according to one of the first checking result and the second checking result. For example, if the logical address L_Addr is found in the temporary P2L address mapping table 117T (e.g., the determination result "Yes" of Step S14), the memory controller 110 may be arranged to obtain the second checking result such as the second physical address P_Addr2 and perform the second read operation according to the second physical address P_Addr2, and more particularly, trigger the NV memory 120 with the second NV read command (e.g., the other flash read command) to start reading at the second physical address P_Addr2 associated with the logical address L_Addr as mentioned in Step S15, and return the data read at the second physical address P_Addr2 to the host device 50 to be the first data as mentioned in Step S16; otherwise (e.g., the determination result "No" of Step S14), the memory controller 110 may be arranged to return the data read at the first physical address P_Addr1 to the host device 50 to be the first data as mentioned in Step S17.

In Step S23, the memory device 100 (or the memory controller 110) may determine whether to perform a next operation, for example, according to whether there is any new host-side event such as the aforementioned any new host-side event (e.g., the aforementioned any new command) of Step S18. If Yes (e.g., the aforementioned any new host-side event is detected by the memory controller 110 before the predetermined waiting time period expires), Step S20 is entered; if No (e.g., no host-side event is detected by the memory controller 110 before the predetermined waiting time period expires), the working flow shown in FIG. 4 comes to the end. For example, the operation of Step S23 may be similar to or the same as the operation of Step S18.

For example, a first time period T1(t11, t12) between a first beginning time point t11 at which the memory controller 110 starts checking the aforementioned at least one L2P address mapping table such as the L2P address mapping table 120T and a first end time point t12 at which the memory controller 110 completes the first read operation, such as the read time T_read (e.g., 68 μs), is typically greater than a second time period T2(t21, t22) between a second beginning time point t21 at which the memory controller 110 starts checking the temporary P2L address mapping table 117T and a second end time point t22 at which the memory controller 110 completes checking the temporary P2L address mapping table 117T, such as the search time T_search (e.g., 15 μs). The memory controller 110 may be arranged to control the second beginning time point t21 to be equal to or later than the first beginning time point t11, to hide the second time period T2(t21, t22) for checking the temporary P2L address mapping table 117T in the first time period T1(t11, t12). In addition, the first time period T1(t11, t12) for checking the aforementioned at least one L2P address mapping table such as the L2P address mapping table 120T and performing the first read operation may comprise the second time period T2(t21, t22) for checking the temporary P2L address mapping table 117T. For brevity, similar descriptions for this embodiment are not repeated in detail here.

For better comprehension, the method may be illustrated with the working flow shown in FIG. 4, but the present invention is not limited thereto. According to some embodiments, one or more steps may be added, deleted, or changed in the working flow shown in FIG. 4.

According to some embodiments, the first checking result may represent the first physical address P_Addr1 associated with the logical address L_Addr as indicated by the aforementioned at least one L2P address mapping table such as the L2P address mapping table 120T. In addition, according to whether the logical address L_Addr is found in the temporary P2L address mapping table 117T, the memory controller 110 may be arranged to determine a selected physical address among at least one candidate physical address (e.g., one or more candidate physical addresses), for reading data at the selected physical address to be the first data, where the selected physical address may be selected from the aforementioned at least one candidate physical address, and the aforementioned at least one candidate physical address may comprise the first physical address P_Addr1. For example, if the logical address L_Addr is found in the temporary P2L address mapping table 117T, the second checking result may represent the second physical address P_Addr2 associated with the logical address L_Addr as indicated by the temporary P2L address mapping table 117T, where the aforementioned at least one candidate physical address may further comprise the second physical address P_Addr2; otherwise, the aforementioned at least one candidate physical address may comprise only the first physical address P_Addr1. For brevity, similar descriptions for these embodiments are not repeated in detail here.

Figure 5:
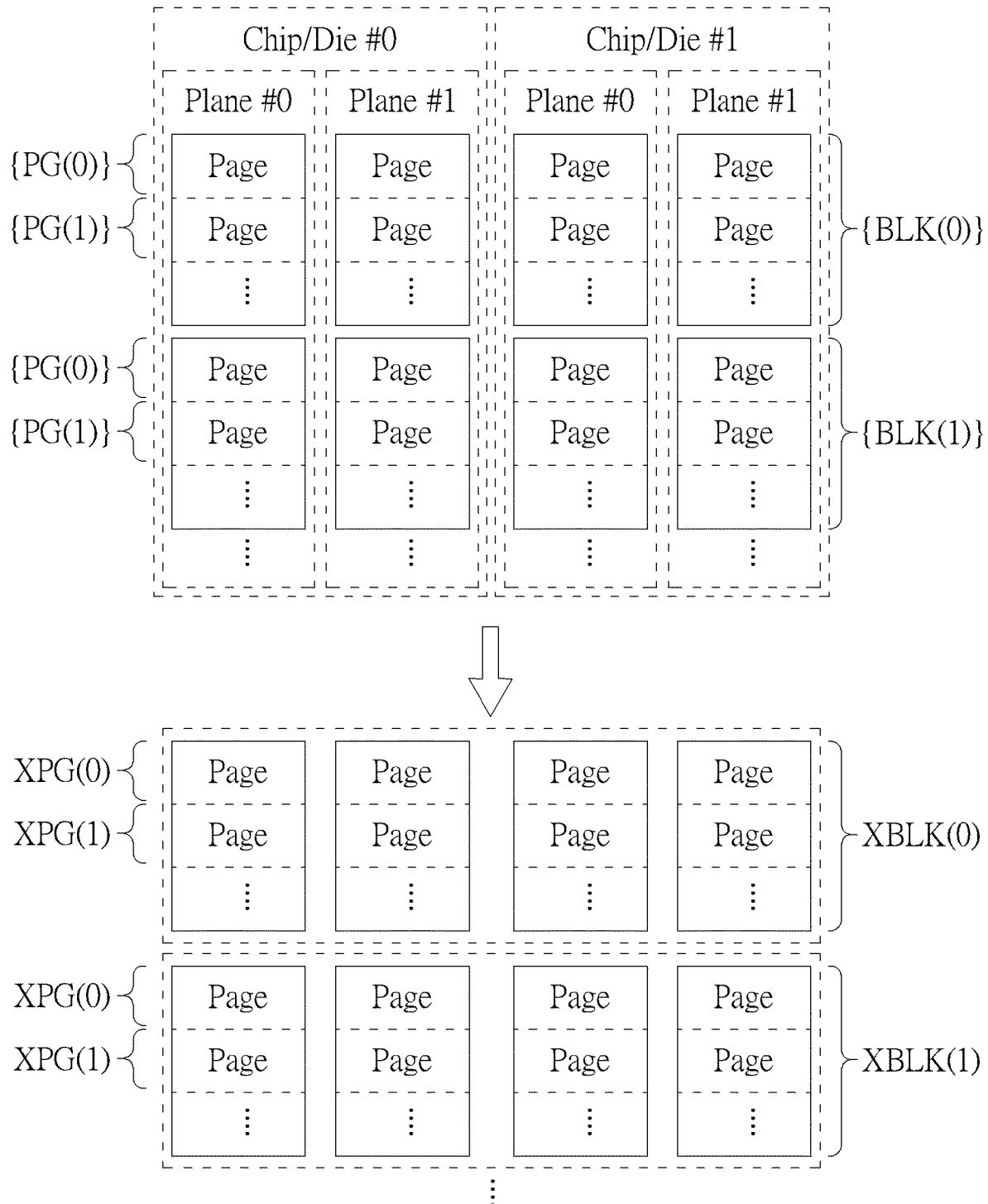
FIG. 5 illustrates a block expansion control scheme of the method according to an embodiment of the present invention.

FIG. 5 illustrates a block expansion control scheme of the method according to an embodiment of the present invention. For example, the plurality of NV memory elements 122-1, 122-2, . . . , and 122-N may be implemented as the plurality of flash memory chips such as the chips #0 and #1 or the plurality of flash memory dies such as the dies #0 and #1, respectively, where the plurality of NV memory elements 122-1, 122-2, . . . , and 122-N may comprise at least two memory elements 122-1 and 122-2 such as the chips #0 and #1 or the dies #0 and #1 (respectively labeled "Chip/Die #0" and "Chip/Die #1" for brevity), but the present invention is not limited thereto. According to some embodiments, the chip count of the plurality of flash memory chips or the die count of the plurality of flash memory dies may vary.

The aforementioned any NV memory element 122-n within the NV memory elements 122-1, 122-2, . . . , and 122-N, such as any chip among the chips #0 and #1 or any die among the dies #0 and #1, may comprise multiple planes such as the planes #0 and #1, where any plane among the planes #0 and #1 of the aforementioned any NV memory element 122-n (e.g., the aforementioned any chip among the chips #0 and #1 or the aforementioned any die among the dies #0 and #1) may comprise its own blocks {BLK} such as the blocks {BLK(0), BLK(1), . . . }. Under control of the memory controller 110, the memory device 100 may combine a set of first corresponding blocks {BLK(0)} in all planes (e.g., the planes #0 and #1) of all NV memory elements (e.g., the chips #0 and #1 or the dies #0 and #1) into a first superblock XBLK(0), but the present invention is not limited thereto. For example, the memory device 100 may combine multiple sets of corresponding blocks {BLK} such as the blocks {{BLK(0)}, {BLK(1)}, . . . } in all planes (e.g., the planes #0 and #1) of all NV memory elements (e.g., the chips #0 and #1 or the dies #0 and #1) into multiple superblocks {XBLK} such as the superblocks {XBLK(0), XBLK(1), . . . }, respectively. In addition, the memory controller 110 may access (e.g., read or write) the multiple sets of corresponding blocks {BLK} such as the blocks {{BLK(0)}, {BLK(1)}, . . . } within the multiple superblocks {XBLK(0), XBLK(1), . . . } according to multiple physical block addresses (PBAs) {XBlk} such as the PBAs {XBlk(0), XBlk(1), . . . }, respectively, and more particularly, access (e.g., read or write) the corresponding pages {PG} (e.g., the pages {PG(0), PG(1), . . . }) within the multiple superblocks {XBLK(0), XBLK(1), . . . } according to the multiple PBAs {XBlk} and the associated physical page addresses (PPAs) {XPg} (e.g., the PPAs {XPg(0), XPg(1), . . . }), respectively. For better comprehension, assuming that "r0" and "r1" may be non-negative integers, a same row of blocks {BLK(r0)} such as the first row of blocks {BLK(0)}, the second row of blocks {BLK(1)}, etc. as illustrated in FIG. 5 may represent a set of corresponding blocks {BLK(r0)} accessed with a same PBA XBlk(r0), and more particularly, may act as a superblock XBLK(r0) among the multiple superblocks {XBLK}. For the row of blocks {BLK(r0)}, a same row of pages {PG(r1)} such as the first row of pages {PG(0)}, the second row of pages {PG(1)}, etc. as illustrated in FIG. 5 may represent a set of corresponding pages {PG(r1)} accessed with a same PPA XPg (r1), and more particularly, may act as a super-page (superpage) XPG(r1) among multiple superpages {XPG} (e.g., the superpages {XPG(0), XPG(1), . . . }).

TABLE 1

| Logical address | Physical address |
|---|---|
| LBA0 | XBlk(5), XPg(0) |
| LBA1 | XBlk(5), XPg(1) |
| LBA2 | XBlk(5), XPg(2) |
| LBA3 | XBlk(5), XPg(3) |
| LBA4 | XBlk(5), XPg(4) |
| LBA5 | XBlk(5), XPg(5) |
| LBA6 | XBlk(5), XPg(6) |
| LBA7 | XBlk(5), XPg(7) |
| LBA8 | XBlk(6), XPg(19) |
| LBA9 | XBlk(5), XPg(9) |
| LBA10 | XBlk(14), XPg(17) |
| LBA11 | XBlk(5), XPg(11) |
| LBA12 | XBlk(5), XPg(12) |
| LBA13 | XBlk(5), XPg(13) |
| LBA14 | XBlk(5), XPg(14) |
| LBA15 | XBlk(5), XPg(15) |
| . . . | . . . |

TABLE 2

| Physical address | Logical address |
|---|---|
| XPg(0) | LBA20 |
| XPg(1) | LBA21 |
| XPg(2) | LBA13 |
| XPg(3) | LBA14 |
| XPg(4) | LBA13 |
| XPg(5) | LBA15 |
| XPg(6) | LBA13 |
| XPg(7) | LBA16 |
| XPg(8) | LBA17 |
| . . . | . . . |

Table 1 illustrates an example of a certain local L2P address mapping table (e.g., the first local L2P address mapping table, which may correspond to a certain logical address range) within the global L2P address mapping table 120T, and Table 2 illustrates an example of the temporary P2L address mapping table 117T, where the symbol " . . . " may indicate that some table contents may be omitted, but the present invention is not limited thereto. According to some embodiments, the contents, the format, etc. of the local L2P address mapping table shown in Table 1 and/or the temporary P2L address mapping table 117T shown in Table 2 may vary. For example, as the ranking and/or the arrangement of the table contents in Table 1 may correspond to the logical addresses {LBA0, LBA1, LBA2, LBA3, LBA4, LBA5, LBA6, LBA7, LBA8, LBA9, LBA10, LBA11, LBA12, LBA13, LBA14, LBA15, . . . } (e.g., the logical block addresses (LBAs) {0, 1, 2, 3, 4, 5, 6, 7, 8, 9, 10, 11, 12, 13, 14, 15, . . . }), the field "Logical address" in Table 1 may be omitted. For another example, as the ranking and/or the arrangement of the table contents in Table 2 may correspond to the physical addresses {XPg(0), XPg(1), XPg(2), XPg(3), XPg(4), XPg(5), XPg(6), XPg(7), XPg(8), . . . } (e.g., the PPAs {0, 1, 2, 3, 4, 5, 6, 7, 8, . . . }), the field "Physical address" in Table 2 may be omitted.

Based on the block expansion control scheme, the memory device 100 (or the memory controller 110 therein) may access the multiple superblocks {XBLK} (e.g., the superpages {XPG} thereof) to access the corresponding blocks {BLK} (e.g., the corresponding pages thereof), and more particularly, store data into one or more superblocks {XBLK} (e.g., the superpages {XPG} thereof) among the multiple superblocks {XBLK} for the host device 50, and read the stored data from the one or more superblocks {XBLK} (e.g., the superpages {XPG} thereof) for being returned to the host device 50. For example, L_Addr=LBA13, and the first command mentioned in Step S20 may indicate that reading the first data at the logical address L_Addr such as the logical address LBA13 is requested. The memory device 100 (or the memory controller 110 therein) may check the aforementioned at least one L2P address mapping table such as the local L2P address mapping table shown in Table 1 to generate the first checking result and start performing the first read operation according to the first checking result as mentioned in Step S21. In addition, the memory device 100 (or the memory controller 110 therein) may check the temporary P2L address mapping table 117T corresponding to a certain active superblock (e.g., the active superblock #18), such as the temporary P2L address mapping table 117T shown in Table 2, to generate the second checking result for selectively performing the second read operation according to the second checking result as mentioned in Step S21, where the aforementioned at least one active block such as the active block 220 may be implemented by way of at least one superblock such as the active superblock XBLK(18) at the PBA XBlk(18).

As the logical address L_Addr such as the logical address LBA13 is found in the temporary P2L address mapping table 117T shown in Table 2, the newest address mapping relationship regarding the logical address L_Addr (e.g., the logical address LBA13) is indicated by the P2L entry (6, LBA13) of the temporary P2L address mapping table 117T (e.g., the temporary P2L address mapping table 117T corresponding to the active superblock #18) shown in Table 2, rather than the L2P entry (LBA13, (XBlk(5), XPg(13))) in the local L2P address mapping table shown in Table 1. Thus, the memory device 100 (or the memory controller 110 therein) may obtain the second physical address P_Addr2 such as the physical address (XBlk(18), XPg(6)) (which may comprise the PBA XBlk(18) and the PPA XPg(6)) and perform the second read operation according to the second physical address P_Addr2 such as the physical address (XBlk(18), XPg(6)), and more particularly, trigger the NV memory 120 with the second NV read command (e.g., the other flash read command) to start reading at the physical address (XBlk(18), XPg(6)) and return the data read at the physical address (XBlk(18), XPg(6)) to the host device 50 to be the first data. For brevity, similar descriptions for this embodiment are not repeated in detail here.

According to some embodiments, as the memory controller 110 may load the local L2P address mapping table (e.g., the first local L2P address mapping table) within the global L2P address mapping table 120T into the RAM 116 to be the temporary L2P address mapping table 116T, the temporary L2P address mapping table 116T may be implemented as shown in Table 1. For brevity, similar descriptions for these embodiments are not repeated in detail here.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for performing data access management of a memory device in a predetermined communications architecture with aid of multi-table checking, the method being applied to a memory controller of the memory device, the memory device comprising the memory controller and a non-volatile (NV) memory, the NV memory comprising at least one NV memory element, the at least one NV memory element comprising a plurality of blocks, the method comprising:

utilizing the memory controller to receive a first command from a host device through a transmission interface circuit of the memory controller, wherein the first command indicates that reading first data at a first logical address is requested;

checking at least one logical-to-physical (L2P) address mapping table to generate a first checking result and starting performing a first read operation according to the first checking result, and checking a temporary physical-to-logical address (P2L) mapping table corresponding to a first active block to generate a second checking result for selectively performing a second read operation according to the second checking result, wherein checking the temporary P2L address mapping table corresponding to the first active block to generate the second checking result comprises:

checking the temporary P2L address mapping table corresponding to the first active block by searching for the first logical address in the temporary P2L address mapping table in order to try obtaining any physical address associated with the first logical address according to the temporary P2L address mapping table to be the second checking result;

wherein whether the second read operation is performed depends on whether the first logical address is found in the temporary P2L address mapping table; and returning the first data to the host device, wherein the first data is read according to one of the first checking result and the second checking result.

2. The method of claim 1, wherein checking the at least one L2P address mapping table to generate the first checking result comprises:

checking the at least one L2P address mapping table to obtain a first physical address associated with the first logical address from the at least one L2P address mapping table to be the first checking result, wherein the at least one L2P address mapping table is arranged to map from the first logical address to the first physical address.

3. The method of claim 1, wherein if the first logical address is found in the temporary P2L address mapping table, the memory controller is arranged to perform the second read operation according to said any physical address associated with the first logical address; otherwise, the memory controller is arranged to prevent performing the second read operation.

4. The method of claim 1, wherein the second checking result indicates whether the first logical address is found in the temporary P2L address mapping table, for determining whether to perform the second read operation.

5. The method of claim 1, wherein if the first logical address is found in the temporary P2L address mapping table, the memory controller is arranged to determine said any physical address associated with the first logical address to be the second checking result; otherwise, the memory controller is arranged to determine a null physical address associated with no logical address to be the second checking result.

6. The method of claim 1, wherein the first checking result represents a first physical address associated with the first logical address as indicated by the at least one L2P address mapping table; and according to whether the first logical address is found in the temporary P2L address mapping table, the memory controller is arranged to determine a selected physical address among at least one candidate physical address, for reading data at the selected physical address to be the first data, wherein the selected physical address is selected from the at least one candidate physical address, and the at least one candidate physical address comprises the first physical address.

7. The method of claim 6, wherein if the first logical address is found in the temporary P2L address mapping table, the second checking result represents a second physical address associated with the first logical address as indicated by the temporary P2L address mapping table, wherein the at least one candidate physical address further comprises the second physical address; otherwise, the at least one candidate physical address comprises only the first physical address.

8. The method of claim 1, wherein a first time period between a first beginning time point at which the memory controller starts checking the at least one L2P address mapping table and a first end time point at which the memory controller completes the first read operation is greater than a second time period between a second beginning time point at which the memory controller starts checking the temporary P2L address mapping table and a second end time point at which the memory controller completes checking the temporary P2L address mapping table, wherein the memory controller is arranged to control the second beginning time point to be equal to or later than the first beginning time point to hide the second time period for checking the temporary P2L address mapping table in the first time period.

9. The method of claim 1, wherein a first time period between a first beginning time point at which the memory controller starts checking the at least one L2P address mapping table and a first end time point at which the memory controller completes the first read operation is greater than a second time period between a second beginning time point at which the memory controller starts checking the temporary P2L address mapping table and a second end time point at which the memory controller completes checking the temporary P2L address mapping table, wherein the first time period for checking the at least one L2P address mapping table and performing the first read operation comprises the second time period for checking the temporary P2L address mapping table.

10. A memory controller of a memory device, the memory device comprising the memory controller and a non-volatile (NV) memory, the NV memory comprising at least one NV memory element, the at least one NV memory element comprising a plurality of blocks, the memory controller comprising:

a processing circuit, arranged to control the memory controller according to a plurality of host commands from a host device, to allow the host device to access the NV memory through the memory controller, wherein the processing circuit is arranged to perform data access management of the memory device in a predetermined communications architecture with aid of multi-table checking; and a transmission interface circuit, arranged to perform communications with the host device;

wherein:

the memory controller receives a first command from the host device through the transmission interface circuit of the memory controller, wherein the first command indicates that reading first data at a first logical address is requested;

the memory controller checks at least one logical-to-physical (L2P) address mapping table to generate a first checking result and starts performing a first read operation according to the first checking result, and checks a temporary physical-to-logical (P2L) address mapping table corresponding to a first active block to generate a second checking result for selectively performing a second read operation according to the second checking result, wherein the memory controller checks the temporary P2L address mapping table corresponding to the first active block by searching for the first logical address in the temporary P2L address mapping table in order to try obtaining any physical address associated with the first logical address according to the temporary P2L address mapping table to be the second checking result, and wherein whether the second read operation is performed depends on whether the first logical address is found in the temporary P2L address mapping table; and the memory controller returns the first data to the host device, wherein the first data is read according to one of the first checking result and the second checking result.

11. The memory device comprising the memory controller of claim 10, wherein the memory device comprises:

the NV memory, configured to store information; and the memory controller, coupled to the NV memory, configured to control operations of the memory device.

12. An electronic device comprising the memory device of claim 11, and further comprising:

the host device, coupled to the memory device, wherein the host device comprises:

at least one processor, arranged for controlling operations of the host device; and a power supply circuit, coupled to the at least one processor, arranged for providing power to the at least one processor and the memory device;

wherein the memory device provides the host device with storage space.

* * * * *